2,796,323

Patented June 18, 1957

2,796,323

CONVERSION OF DIMETHYL ETHER BORON TRIFLUORIDE COMPLEX TO POTASSIUM FLUOBORATE

Allan R. Eberle, South Plainfield, N. J., assignor to the United States of America as represented by the United States Atomic Energy Commission No Drawing. Application June 30, 1954,
Serial No. 440,574

4 Claims. (Cl. 23—59)

The present invention relates to a method of preparing potassium fluoborate from the dimethyl ether complex of boron trifluoride.

The dimethyl ether complex of boron trifluoride has been found useful in a process of separating the isotopes of boron. The separation process is a difficult and costly one and the isotope rich products are accordingly valuable. When it is desired to convert such products into another chemical form it is therefore important that a high yield be obtained. The possibility of obtaining such high yield is obviously enhanced if the number of steps of a process of conversion is minimized since additional losses usually occur with each additional step of a process.

It is accordingly one object of the present invention to provide a direct method converting the dimethyl ether complex of boron trifluoride to potassium fluoborate.

It is another object of the present method to provide a method of achieving high yield in the conversion of the dimethyl ether complex of boron trifluoride to potassium fluoborate.

Other objects will be in part obvious and in part pointed out hereinafter.

In one of its broader aspects the present method may be carried out by introducing the dimethyl ether complex of boron trifluoride into an aqueous solution of potassium fluoride and alcohol, expelling ether liberated from the complex and recovering the potassium fluoborate formed.

The concentration of alcohol in the solution is subject to variation but a concentration which results in a higher concentration of both alcohol and potassium fluoride is preferred. Higher concentrations of alcohol in solution are desirable because the presence of alcohol reduces the concentration of the $KBF_4$ product in solution. Higher concentrations of KF in solution are desirable because greater production of $KBF_4$ product results. The composition of a solution of water, ethyl alcohol and potassium at which the highest concentration of potassium fluoride and alcohol can be achieved contains approximately 12% KF; 57% $H_2O$ and 31% $C_2H_5OH$ by weight.

The following examples evidence the advantages which may be achieved through use of the subject method although it will be realized that the scope of the method is not confined to these examples but that they are only illustrative of the method.

Example I

A solution containing 24 grams of anhydrous potassium fluoride, 111 milliliters of water and 81 milliliters of alcohol was prepared in a weighed 200 milliliter reaction flask. To this solution there was added 38.5 milliliters of dimethyl ether-boron trifluoride. The flask was connected through a reflux condenser to a graduated receptacle immersed in a cold trap comprising acetone and carbon dioxide. The contents of the flask were heated to 90° C. for two hours. Sixteen milliliters of ether were collected in the cold trap. The temperature of the bath was raised to 115° C. and the alcohol and water distilling off were collected. They comprised 175 milliliters of the ingredients. The reaction flask with the potassium fluoborate salt was dried at 110° C. for 15 hours. The salt was in the form of a solid white cake. On weighing this salt it was determined that a yield of 100% had been achieved.

Example II

A solution containing 2.036 kilograms of potassium fluoride dihydrate, 5.020 liters of water and 4.262 liters of 95% by weight ethyl alcohol was prepared in an 18 liter container. To this mixture, which was constantly stirred, there was added fairly rapidly 2.000 liters of dimethyl ether-boron trifluoride complex. This mixture was then heated on a steam bath for a period of one hour to expel all of the dimethyl ether produced during the reaction. The mixture was then cooled to room temperature, filtered and washed with a small amount of ethyl alcohol. The mixture filtered very rapidly to an almost dry white powder. The salt was finally dried for two days at 110° C. The yield of potassium fluoborate was 2.665 kilograms. The theoretical yield was 2.772 kilograms and the percent yield was 96.1 percent.

It is apparent from the foregoing examples that the present invention provides a relatively direct method of converting the dimethyl ether complex of boron trifluoride to potassium fluoborate in high yields.

However, it is also apparent that it is possible to vary a number of the individual steps without departing from the scope of the subject method. For example, soluble dimethyl ether may be removed over a period of 2 to 3 hours by alternate standing and stirring of the solution rather than by heating to 90° C. for one hour. Other permissible variations of the individual steps will be apparent from a comparison of the steps of the illustrative examples given above.

It is further evident from the examples that the ether and alcohol may be recovered and recycled. While the method of Example I indicates that a 100% yield is achieved by complete evaporation of these solvents, the separation of the alcohol-water solvent by filtration has the advantage of being more economical in that the necessity for complete evaporation of the solvent is eliminated. When this economy is coupled with the fact that any potassium fluoborate in the alcohol-water filtrate is not lost since this filtrate is recycled as solvent simply by dissolving additional potassium fluoride therein prior to again dissolving the dimethyl ether complex therein, it is apparent that the yield of the method which combines filtration and recycling is higher than that obtained with the fresh solvent. The directness of the method, the economy and ease of recycling, the high yield achieved and the ease of filtration are features of the present method not found in other methods of converting the dimethyl ether complex of boron trifluoride to potassium fluoborate.

One additional advantage of the filtration method is that it is not necessary to react the KF and complex in exact stoichiometric proportions since any excess of ether reactant passes to the filtrate and is recycled with this filtrate as a contribution to the concentrations of reactants in the recycled solvent. The filtration procedure also makes possible elimination of certain impurities which may be present in KF such as iron or heavy metals.

Since many applications might be made of the above described invention and since many changes might be made in the method as illustratively described herein, it is to be understood that all matter hereinabove set forth is to be interpreted as illustrative only and not in a limiting sense, except as may be required by the appended claims.

I claim:

1. The method of converting the dimethyl ether complex of boron trifluoride to potassium fluoborate which comprises introducing said complex into an aqueous-ethanol solution containing potassium fluoride, expelling ether liberated from said complex and recovering the potassium fluoborate formed.

2. The method of converting the dimethyl ether complex of boron trifluoride to potassium fluoborate which comprises introducing said complex into an aqueous-ethanol solution saturated with potassium fluoride, expelling ether liberated from said complex and recovering the potassium fluoborate formed.

3. The method of converting the dimethyl ether complex of boron trifluoride to potassium fluoborate which comprises introducing said complex into a solution containing approximately 57% water, 31% ethyl alcohol and 12% potassium fluoride by weight, expelling ether liberated from said complex and recovering the potassium fluoborate formed.

4. The method of converting the dimethyl ether complex of boron trifluoride to potassium fluoborate which comprises introducing said complex into a solution containing approximately 57% water, 31% ethyl alcohol and 12% potassium fluoride by weight, expelling ether liberated from said complex separating the potassium fluoborate from the solution by filtration, recovering the filtrate and recycling it as solvent by addition of 12% by weight of potassium fluoride thereto.

No references cited.